United States Patent
Rusmisel et al.

(10) Patent No.: US 7,535,827 B2
(45) Date of Patent: May 19, 2009

(54) HIGH AVAILABILITY OF RESOURCES IN TELECOMMUNICATIONS NETWORK USING SYNCHRONIZED REDUNDANCY MECHANISM

(75) Inventors: Jason Dirk Rusmisel, Ottawa (CA); Jane Jinhua Liu, Kanata (CA); Keven Jules Eyre, Ottawa (CA)

(73) Assignee: Alcatel Lucent, Paris (FR)

( * ) Notice: Subject to any disclaimer, the term of this patent is extended or adjusted under 35 U.S.C. 154(b) by 922 days.

(21) Appl. No.: 10/681,238

(22) Filed: Oct. 9, 2003

(65) Prior Publication Data
US 2005/0078600 A1    Apr. 14, 2005

(51) Int. Cl.
*H04L 12/26* (2006.01)
(52) U.S. Cl. ............... 370/219; 370/221; 370/395.5
(58) Field of Classification Search ............... 370/219, 370/221, 395.5
See application file for complete search history.

(56) References Cited

U.S. PATENT DOCUMENTS

| | | | |
|---|---|---|---|
| 7,093,160 B2 * | 8/2006 | Lau et al. | 714/11 |
| 7,177,269 B2 * | 2/2007 | Rombeaut et al. | 370/219 |
| 7,292,535 B2 * | 11/2007 | Folkes et al. | 370/238 |
| 2002/0141429 A1 | 10/2002 | Pegrum et al. | |
| 2008/0002669 A1 * | 1/2008 | O'Brien et al. | 370/352 |

* cited by examiner

*Primary Examiner*—Jason E Mattis

(57) ABSTRACT

Redundancy mechanisms are difficult to implement in a node holding connections spanning over a wide telecommunications network. Novel redundancy mechanisms to be implemented on a telecommunications node is described. In the mechanisms, an inactive device is maintained in hot standby with the active device so that a substantially hitless activity switch can be performed. The inactive device is kept in synchrony with the active device by updating the inactive device only when the status of connection has changed.

14 Claims, 4 Drawing Sheets

HIGH AVAILABILITY OF RESOURCES IN TELECOMMUNICATIONS NETWORK USING SYNCHRONIZED REDUNDANCY MECHANISM

FIELD OF INVENTION

The invention resides generally in the field of management of telecommunications network involving nodes consisting of routers, packet forwarding engines, switches, etc. In particular, it relates to hot standby redundancy mechanisms at a node and to realization of improved availability in network resources.

BACKGROUND OF INVENTION

Telecommunications networks employ a wide variety of redundancy mechanisms in order to provide high resource availability. Generally speaking, a redundancy mechanism involves an active device and one or more inactive devices (standbys) and it improves resource availability by switching over to activate an inactive device when an active device fails or is taken off service due to a variety of reasons. However, routing and bridging protocol devices are not designed to easily allow dual or synchronous standby architecture within routers and switches to provide high availability. TCP/IP (Transmission Control Protocol/Internet Protocol), MPLS (Multi-Protocol Label Switching) BGP (Border Gateway Protocol) and OSPF (Open Shortest Path First) are examples of such routing and bridging protocols and are presently widely in use throughout the telecommunications network. The difficulty in implementing redundancy mechanisms in such protocols stems from the fact that such protocols exchange messages over telecommunications paths or connections which span over a wide geographical areas. Routing information, including setup/teardown of connections, must be constantly updated with co-operation by many nodes spread over the network. The active device uses such information to control the connections among nodes. When activated, the inactive device must also have same information to maintain the proper operation of the network. It is desired that no connections are dropped by an activity switch.

One known redundancy technique for addressing process failures involves configuring two or more devices from different vendors in parallel. It is assumed that devices from different vendors are susceptible to different types of failures, such as those that might be caused by an offending message, a hardware fault, or a software fault. This type of redundancy technique is generally expensive due to the inherent cost of the multiple devices and because using equipment from multiple vendors causes additional operation, support, network management, and training costs. Additionally, the technique requires additional messages to be exchanged to move through paths onto tandem devices, if any, thus increasing cost, complexity, and network traffic.

Among the redundancy techniques, some keep the inactive module or device (control card) in cold standby and others keep the inactive control card in hot standby with the active card. In the cold standby, an activity switch (switch-over from an active card to an inactive or standby card) requires starting of the inactive card from cold. The starting of the standby card generally involves discovering routes, connections or paths, loading the routing information and re-establishing connections. These operations flood the network and also take a substantial amount of time, resulting in dropped connections or other undesirable effects. In the hot standby scheme, some or all of the protocol stacks are run by both the active and inactive modules concurrently for at least a certain required period of time so that they both hold same routing information and other necessary data. An activity switch does not involve discovery of routes, connections or paths before the take-over by the inactive card but the active and inactive cards must be synchronous with one another so that a hitless (faultless) switch-over can be performed. The synchronization between two cards in the execution of the protocol stacks is important. Running a protocol stack in identical active and inactive control cards does not necessarily ensure synchrony due to the fact that the active card may have additional tasks that the inactive card needs not perform. It is also possible that both cards are of different releases or of different venders. In such cases, the same protocol stacks may not be executed synchronously and may result in different decisions to be made on a same stimulus.

United States Patent Application No. 20020141429 published on Oct. 3, 2002, Pegrum et al, is entitled "High Availability Packet Forwarding Apparatus and Method". Its abstract states:

A high availability packet forwarding router for an internet protocol (IP) network, includes two control processors, one or more service termination cards (STCs) with forwarding information bases (FIBs), and a packet forwarding engine. The two processors run asynchronously in a master/standby relationship. Integrity of processes running on the control processors is monitored and the forwarding engine forwards packets according to a FIB maintained by an in-service one of the control processors. Hitless failover and hitless software upgrades are supported.

This application does not address how the control processors are kept in the master/standby relationship, particularly with respect to RSVP, RSVP being part of MPLS protocol. It is silent about how the two controllers are kept in hot standby to provide control processor protection to a single LSP (Label Switched Path).

Applicant's U.S. patent application Ser. No. 10/350,817 filed on Jan. 24, 2003 entitled "Method and Apparatus for Facilitating Routing Protocol Redundancy in a Network Element" by Kendall Harvey et al discloses a method and apparatus for synchronizing routing protocol information associated with a plurality of routing modules of a network element. The application describes cases of adding an additional routing module to a network element or switching over to a standby module. One disclosed embodiment facilitates synchronization of redundant routing modules in a network element. In that embodiment, lower layer protocol (e.g., TCP) and higher layer protocol (e.g., BGP) tasks of a first routing module are synchronized with respective lower layer protocol (e.g., TCP) and higher layer protocol (e.g., BGP) tasks of a second routing module. The first routing module and the second routing module are redundant routing modules within a network element. Protocol information (e.g., TCP packets, BGP packets, etc) that is processed on the first routing module (e.g., an active one of a plurality of redundant routing modules) is similarly processed on the second routing module (e.g., an inactive one of the plurality of redundant routing modules). Accordingly, this arrangement can be called a hot standby scheme in which both modules are kept synchronous because they both run concurrently on all the received messages.

The described technique allows an activity switch without adversely affecting service. For example, after such an activity switch, a newly active routing module (i.e., previously the inactive routing module) processes routing updates that would normally be received by a newly inactive routing module (i.e., previously the active routing module). Furthermore, the newly active routing module does not become out of date with respect to routing information maintained on other network elements. In this manner, the network is not burdened by a burst of updates in response to the activity switch. Limiting the burden of such a burst of updates eliminates "churn" in the routing tables of network elements, thus improving performance of the network. Significantly, service of existing routes is maintained, and change to existing routes, deletion of routes, and addition of routes can continue uninterrupted; the switchover is transparent to neighboring routers. By being transparent to neighboring routers, a technique disclosed herein need not require cooperation of neighboring routers to enable an activity switch. Accordingly, neighboring routers need not be made aware of such an activity switch, nor do they need to support protocol extensions to enable such an activity switch.

As mentioned earlier, running the both modules concurrently will not necessarily result in same decisions to be made on the same stimulus. The invention ensures that the active and inactive modules stay synchronized.

The invention will be described in connection with the problem of improving availability in MPLS networks, particularly to providing high availability on LSPs that are set up and maintained using RSVP-TE (Resource Reservation Protocol-Traffic Engineering). It should, however, be noted that though the description below deals primarily with MPLS environment, the concept is equally applicable to any other network architectures that exhibit similar difficulties.

FIG. 1 illustrates the essence of the problems that can be encountered in the network under discussion. In the Figure, an MPLS network 10 is shown as an example but as mentioned earlier, discussion should apply to similar networks. Nodes 1, 2 and 3 along the path of an LSP 12 continually send and receive messages, e.g., status messages 14, concerning the status of the LSP. Node 2 is shown in more detail as comprising an active card 20 and an inactive card 22, each of which contains a control module including, among other blocks, a block containing an MPLS state machine. When an activity switch 24 occurs from an active control card to an inactive control card in cold standby, the MPLS state machine in the newly active card performs a complete MPLS restart. This causes dropped connections.

FIG. 2 shows the nature of the messaging used for LSPs between two nodes. Each messaging consists of exchanges of traffic e.g., query-response or instruction-acknowledgement. The setup and teardown messaging each happen only once for an LSP, whereas the refresh related messaging happens often. The problem with a direct implementation of hot standby between the control cards by using e.g., the protocol hooks, is that with so much messaging it is difficult to maintain synchronization between the cards.

SUMMARY OF INVENTION

In accordance with one aspect, the invention realizes improvement in resource availability in telecommunications networks, by employing a hot standby scheme of the redundancy technique. The invention keeps the active and inactive devices in synchrony by the use of synchronization messages between them. The synchronization messages are sent only when a connection status changes.

In accordance with a further aspect, the invention permits to retain synchronization of the inactive MPLS block with the active one so that activity switch can be performed in a hitless manner.

In accordance with yet another aspect, the invention achieves a hitless (or substantially hitless) activity switch by keeping the inactive device in synchrony with the active device only when a connection status changes, by the use of decisions made by the active device.

In a further aspect, the invention uses synchronization messages to update the inactive device whenever the status of a connection changes and the active device makes decisions based upon the change in the status.

In one aspect, the invention resides in the field of MPLS networks and employs a hot standby scheme in the redundancy mechanism. The active device processes the routing information related to a label switched path and makes necessary decisions based on it. Whenever the status of the path changes, the active device additionally sends synchronization messages to the inactive device so that the latter updates its state machine and forwarding table with the routing information and decisions.

In another aspect, the invention is the result of realization that it is difficult to maintain an inactive MPLS controller in hot standby mode in synchrony with an active controller. It has been realized that RSVP-TE refresh related messages can be filtered out and yet the inactive controller can be kept synchronized with the active using messages concerning changes of connection status.

In a further aspect, the invention resides in a node of a telecommunications network, which node comprises redundant routing processor modules, one module being an active module and the other an inactive module. The invention is particular is directed to a method of maintaining the inactive module in hot standby mode with the active module. The method comprises steps of sending from the active module to the inactive module only a status affecting message which affects the status of a connection being held by the active module and updating the inactive module in response to the status affecting message so that the inactive module is maintained in hot standby with the active module.

In accordance with a yet another aspect, the invention resides in a node of a telecommunications network, which node comprises redundant MPLS processor modules, one module being an active module and the other an inactive module. The invention is directed to a method of maintaining the inactive module in hot standby mode with the active module. The method comprises a step of sending from the active module to the inactive module only a status affecting message which affects the status of an label switched connection being held by the active module. The method further comprises steps of updating the inactive module in response to the status affecting message so that the inactive module is maintained in hot standby with the active module, and performing an activity switch from the active module to the inactive module to reverse the roles of both modules so that the label switched connection is now held by the newly active module and the newly inactive module is maintained in hot standby.

In accordance with a further aspect, the invention is directed to a telecommunications node comprising two routing control cards which are interchangeably maintained as active and inactive at any one time. Each of the control cards comprises a distributed processor for running protocols for managing a communications path and a message processor for sending synchronization messages to the other control card to update the distributed processor of the other control card. While being maintained active, the distributed processor processes all signaling messages concerning the communications path and generates the synchronization messages indicating new status when the status of the communications path has changed. While being maintained inactive, the distributed processor for receiving the synchronization messages from the other control card to stay synchronized with the distributed processor of the other control card.

DETAILED DESCRIPTION OF EMBODIMENTS OF INVENTION

The invention is the result of realization that the active and inactive cards do not have to be in total synchrony throughout the execution of the their protocols. In fact it is difficult to maintain both the active and inactive cards in total synchrony. They may not be identical in construction because they may be of different release of the same product or they may be from different vendors. It is required that the inactive card should contain an updated state machine and necessary routing information at the time of an activity switch. In the MPLS environment, at least the MPLS state machine within the inactive control card needs to be in hot standby with the active control card. According to this embodiment, a hot-standby mechanism is introduced to MPLS control. This function reduces, or eliminates, dropped connections that normally result from a switch-over in MPLS control.

According to one embodiment of the invention, the active control card filters out all refresh related messaging, and sends only setup and teardown messaging to the inactive control card, which is sufficient to maintain the inactive card in hot-standby with the active card. That is, the active card only propagates RSVP-TE messages when there is a change in the state of an LSP, instead of propagating all protocol messaging. It should be noted that in RSVP-TE, the refresh related messages are repeated transmission of the original setup message. In other protocols, other forms of messages may be used for refreshing the LSP. Furthermore, whenever there is an LSP state change, the inactive control card updates its forwarding tables accordingly.

Figure 1:
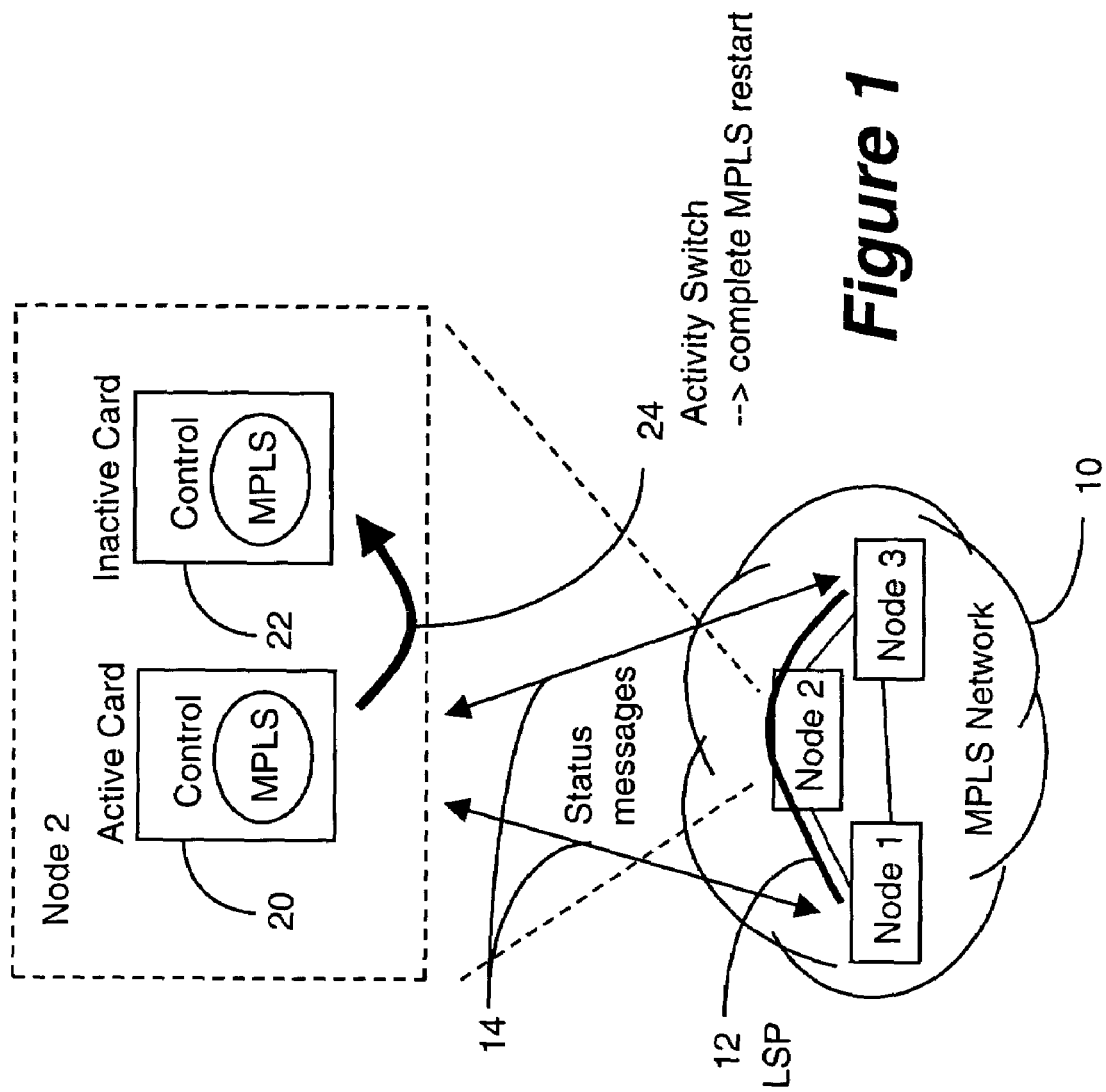
FIG. 1 is a schematic illustration of a telecommunications network showing nodes through which an LSP has been established.
Figure 2:
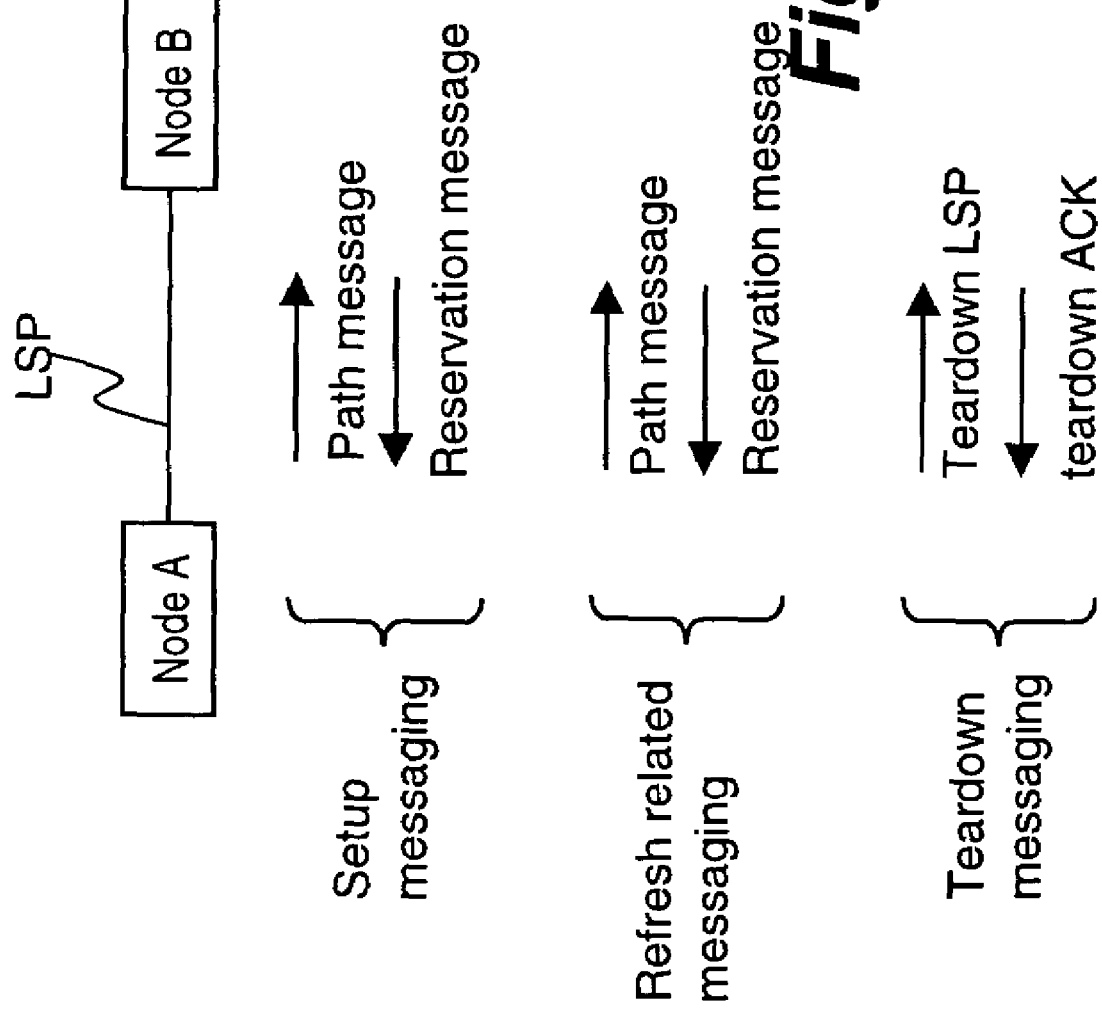
FIG. 2 is a diagram showing messaging mechanisms, RSVP-TE, of MPLS protocol.
Figure 3:
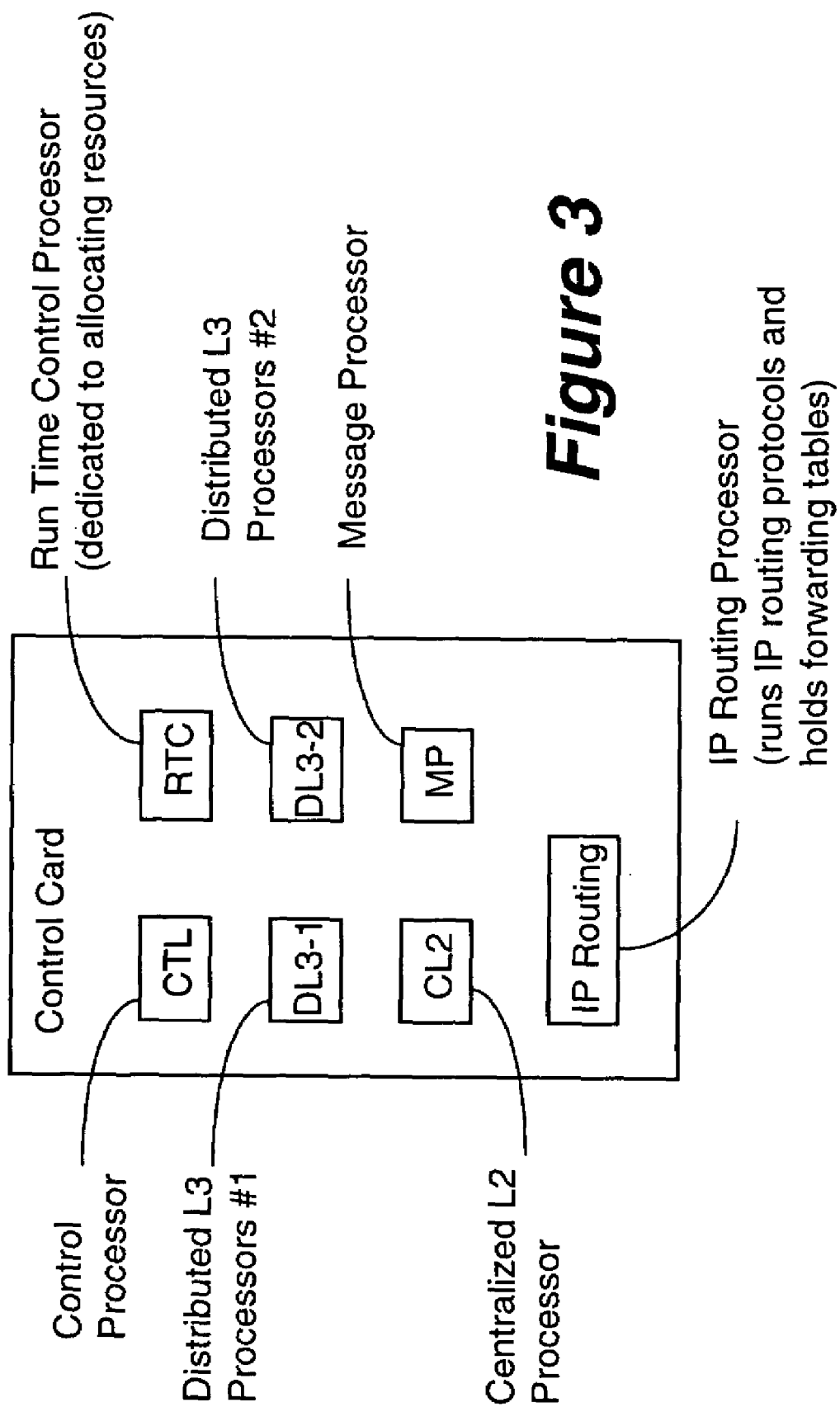
FIG. 3 is a view of a control card in accordance with one embodiment, showing a variety of processor blocks.

FIG. 3 illustrates one of the embodiments and it is a view of a control card for handling traffic e.g., MPLS traffic on LSP. In the FIG. 3, the control card contains various processors, e.g., a control processor, a run time control processor, distributed layer 3 (DL3) processors, a centralized layer 2 (CL2) processor and an IP routing processor. The blocks are identified by the processor they contain. It should, however, be noted that the blocks also contain all the necessary modules and devices to perform designed functions with the identified processors. The centralized layer 2 processor controls layer 2 connections such as ATM, PPP (point-to-point) connections. The DL3-1 processor executes the layer 3 protocol state machine such as MPLS state machine. In this particular embodiment, a second DL3 processor DL3-2 is provided to also handle ATM protocols. IP Routing processor runs IP routing protocols and holds forwarding tables. Run Time Control (RTC) processor is dedicated to allocating resources. Control (CTL) processor coordinates all the operations of various processors. In accordance with one embodiment, there are two control cards, each of which contains the above modules. One control card is active and another inactive. DL3-1 of the active card generates synchronization messages as needed. The Message processor of the active card sends them to the inactive card to keep DL3-1 of the inactive card in synchrony with DL-1 of the active card. The DL3-1 of the inactive card is therefore updated from time to time by the active card with respect to the information needed for hitless activity switch.

Figure 4:
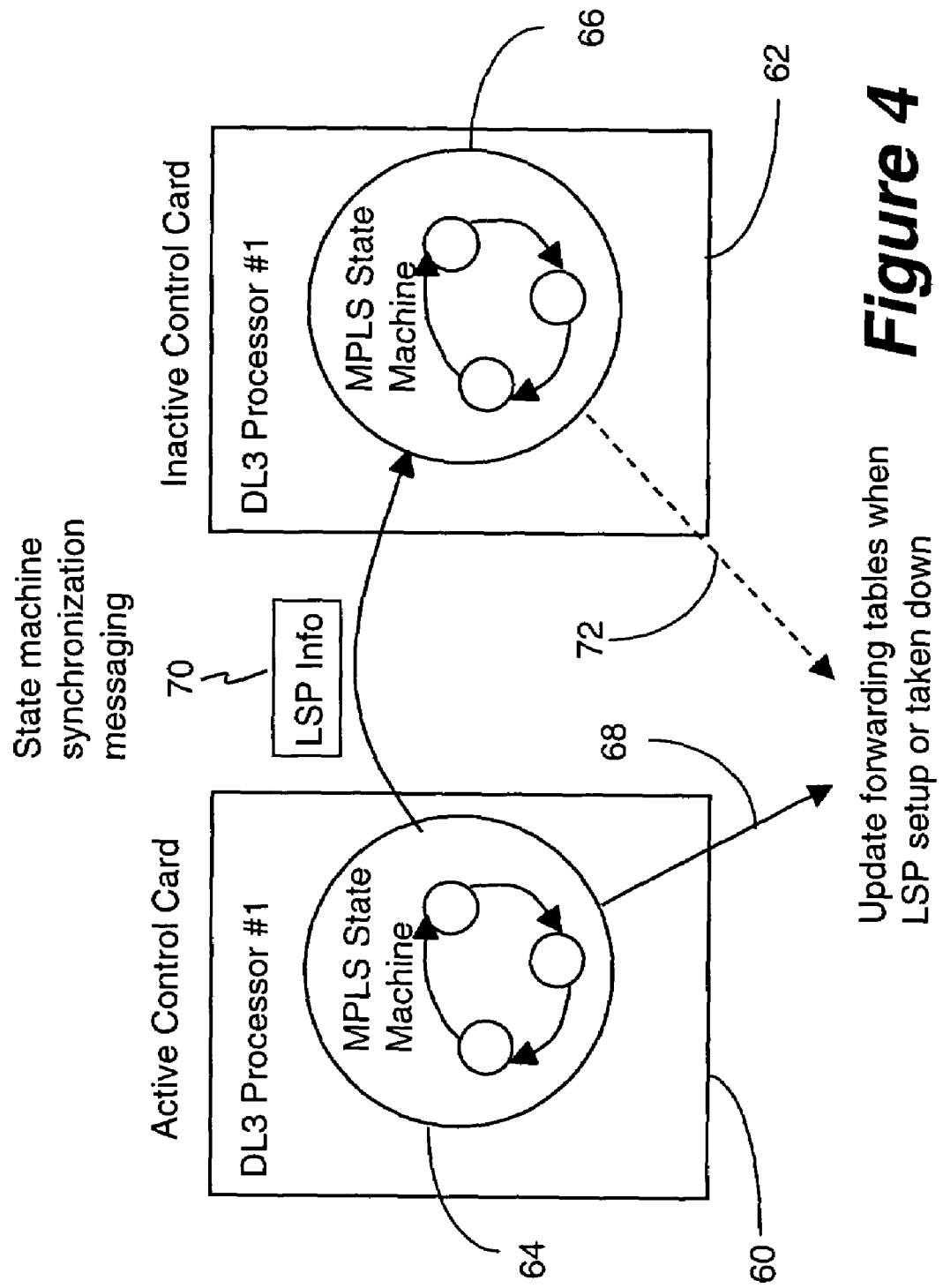
FIG. 4 is a schematic illustration of synchronization of MPLS state machines in the active and inactive devices, in accordance with one embodiment of the invention.

FIG. 4 depicts schematically synchronization of the MPLS state machine in the DL3 processors of the active control card 60 and inactive control card 62. The figure schematically shows running of MPLS state machine 64 and 66 in DL3 processors of the active and inactive cards. The DL3 processor with MPLS state machine on the active card runs the required protocols to operate the network, including sending updated forwarding tables to the IP routing processor when an LSP is setup or taken down as shown by an arrow 68. At the same time, the active card sends a state machine synchronization message 70 to the inactive card only when a change of state of an LSP occurs, e.g., LSP setup or tear-down completed. The inactive card 62 updates its MPLS state machine and forwarding tables accordingly. After an activity switch, the role of control cards 60 and 62 changes and newly activated card 62 performs the same functions as did the card 60 as indicated at 72. Instead of processing all the signaling messages as done in a typical hot standby mechanism, the inactive card does not process signaling messages but only updates its state machine and routing table in accordance with the message received from the active card, thereby avoiding the problem of different decisions being made by two controllers. Synchronization of the state machines of the active and inactive cards eliminates or reduces the number of dropped connections during an activity switch-over of the control cards.

The state machine synchronization message should contain the LSP information which includes resources (e.g. bandwidth, colour/preferences, explicit route), endpoint information (e.g. MPLS label, egress interface), FECs (forwarding table entries), and the LSP ID.

Since the inactive control card is kept in hot-standby, its MPLS state machine is synchronized to that of the active control card. Therefore, when an activity switch occurs there is no disruption to the state of the LSPs.

After the activity switch, the CTL processor starts an audit on the newly active DL3 processor. It does this by comparing information on connections to that stored in its database. The CTL stores LSP information if it is the source node of the LSP. Midpoint nodes of an LSP will clean-up their connections in response to refresh related messages.

What is claimed is:

1. In a node of a telecommunications network, which node comprises redundant routing processor modules, each redundant routing processor module including a primary control processor, a run time control processor, a message processor and a distributed layer processor, one module being an active module and the other an inactive module, a method of maintaining the inactive module in hot standby mode with the active module, comprising steps of:

coordinating operations of the run time control processors, the message processors, and the distributed layer processors, with the primary control processors, allocating resources between the message processors and the distributed layer processors with the runtime control processors, sending from the message processor of the active module to the distributed layer processor of the inactive module only a status affecting message which affects the status of a connection being held by the active module by filtering out all signaling messages, and updating only a state machine and routing table in the distributed layer processor of the inactive module in response to the status affecting message so that the inactive module is maintained in hot standby with the active module.

2. The method according to claim 1, wherein the active module holds the connection by exchanging signaling messages, the method further comprising the step of:

sending a synchronization message to the inactive module, the synchronization message containing information on how a status of the connection has been changed.

3. The method according to claim 2, wherein the active module holds routing information, makes decisions based on the exchanged signaling messages and updates the routing information, the method further comprising a step of:

the active module sending the synchronization message to the inactive module, the synchronization message containing the decisions which affect the status of the connection.

4. The method according to claim 3, wherein the status of connections is affected by setup, modification, and teardown of a connection.

5. The method according to claim 4, wherein the connection is a label switched path and the routing processor module performs protocols for managing the label switched path.

6. The method according to claim 5, wherein the processor module is a MultiProtocol Label Switching (MPLS) processor module for managing the label switched path, the signaling messages are RSVP messages, and the status affecting messages are messages indicating connection setup, modification, and teardown.

7. The method according to claim 6, wherein the signaling messages to be filtered are refresh related messages.

8. The method according to claim 7, wherein the synchronization messages contain information concerning any of resources, endpoint information, forwarding table entries, and label switched path ID.

9. In a node of a telecommunications network, which node comprises redundant MultiProtocol Label Switching (MPLS) processor modules, each redundant MPLS routing processor module including a primary control processor, a run time control processor, a message processor and a distributed layer processor, one module being an active module and the other an inactive module, a method of maintaining the inactive module in hot standby mode with the active module, comprising steps of:

coordinating operations of the run time control processors, the message processors, and the distributed layer processors, with the primary control processors, allocating resources between the message processors and the distributed layer processors with the runtime control processors, sending from the message processor of the active module to the distributed layer processor of the inactive module only a status affecting message which affects the status of an label switched path being held by the active module by filtering out all signaling messages, updating only a state machine and routing table in the distributed layer processor of the inactive module in response to the status affecting message so that the inactive module is maintained in hot standby with the active module, and performing an activity switch from the active module to the inactive module to reverse the roles of both modules so that the label switched path is now held by the newly active module and the newly inactive module is maintained in hot standby.

10. The method according to claim 9, further comprising a step of:

the newly active module performing an audit of the label switched paths before the activity switch is performed.

11. A telecommunications node comprising two routing control cards which are interchangeably maintained as active and inactive at any one time, each of the control cards comprising:

a distributed processor for running protocols for managing a communications path, a message processor for sending synchronization messages to the other control card to update the distributed processor of the other control card wherein a state machine and a routing table are updated in accordance with said synchronization messages without processing any signaling messages, a run time control processor for allocating resources between the message processor and the distributed processor, and a primary control processor for coordinating operations of the run time control processor, the message processor and the distributed processor, characterized in that while being maintained active, the distributed processor processes all signaling messages concerning the communications path and generates the synchronization messages indicating new status when the status of the communications path has changed, and while being maintained inactive, the distributed processor for receiving the synchronization messages from the other control card to stay synchronized with the distributed processor of the other control card.

12. The node according to claim 11, wherein the communications path is a label switched path and the active and inactive control cards comprise state machines for managing the label switched path and the synchronization messages containing new decisions made by the active control card and a new forwarding table, and upon updating, the inactive control card comprises an updated state machine and forwarding table which have been updated in accordance with the decisions and the new forwarding table.

13. The node according to claim 12, wherein both state machines run a MultiProtocol Label Switching (MPLS) protocol, the node further comprising a control processor for performing an activity switch from the active control card to the inactive control card to reverse the roles of the control cards so that the label switched path is now held by the then inactive control card and the then active control card is maintained in hot standby.

14. The node according to claim 13, wherein the synchronization messages contain information concerning any of resources, endpoint information, forwarding table entries, and label switched path ID.

* * * * *